(No Model.) 2 Sheets—Sheet 1.
E. A. REESE, S. N. HENCH & W. A. DROMGOLD.
MECHANISM FOR OPERATING SAWMILL CARRIAGES.
No. 491,447. Patented Feb. 7, 1893.
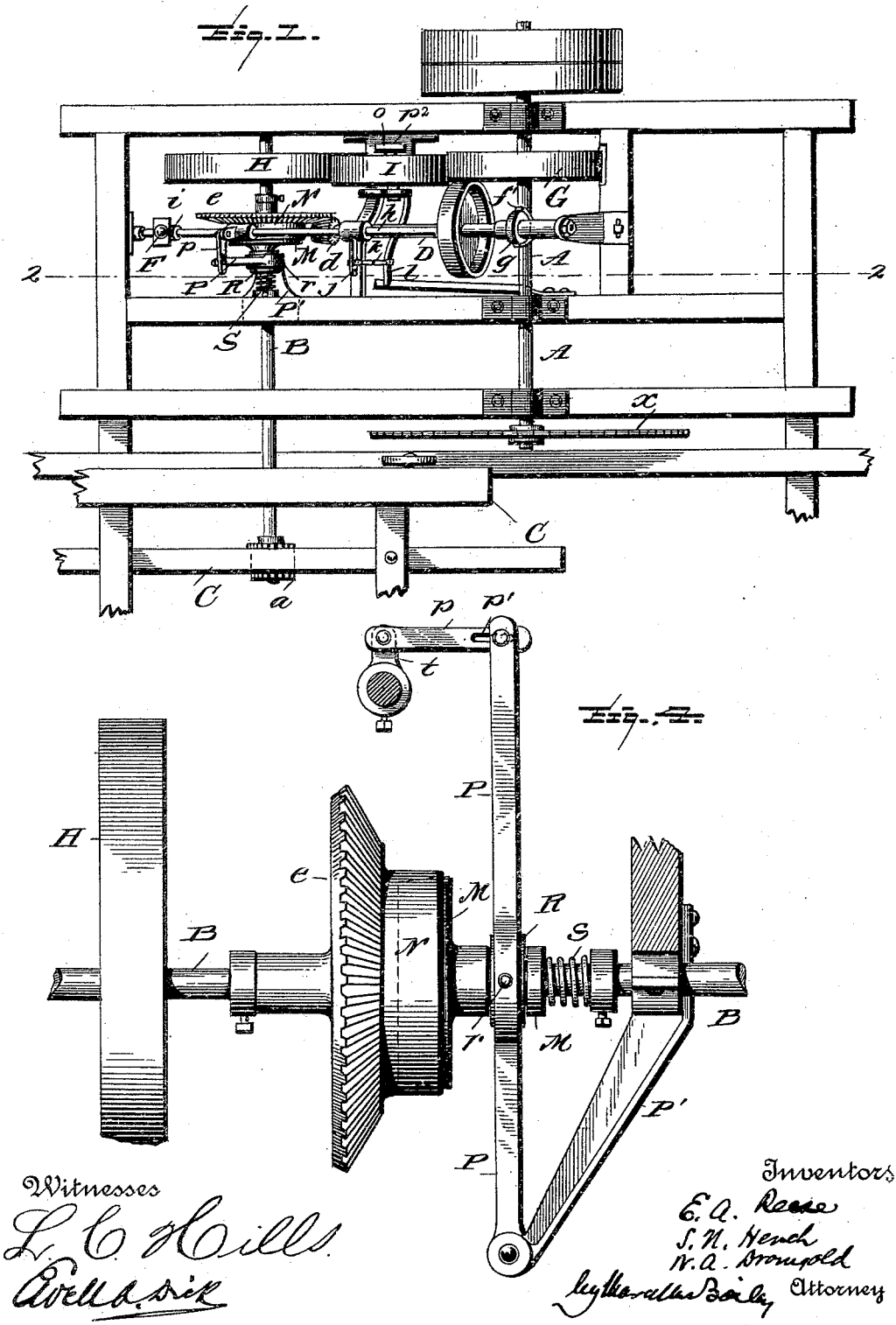
Witnesses
L. C. Hills
Avell A. Dick
Inventors:
E. A. Reese
S. N. Hench
W. A. Dromgold
by Marcellus Bailey Attorney (No Model.) 2 Sheets—Sheet 2.
E. A. REESE, S. N. HENCH & W. A. DROMGOLD.
MECHANISM FOR OPERATING SAWMILL CARRIAGES.
No. 491,447. Patented Feb. 7, 1893.
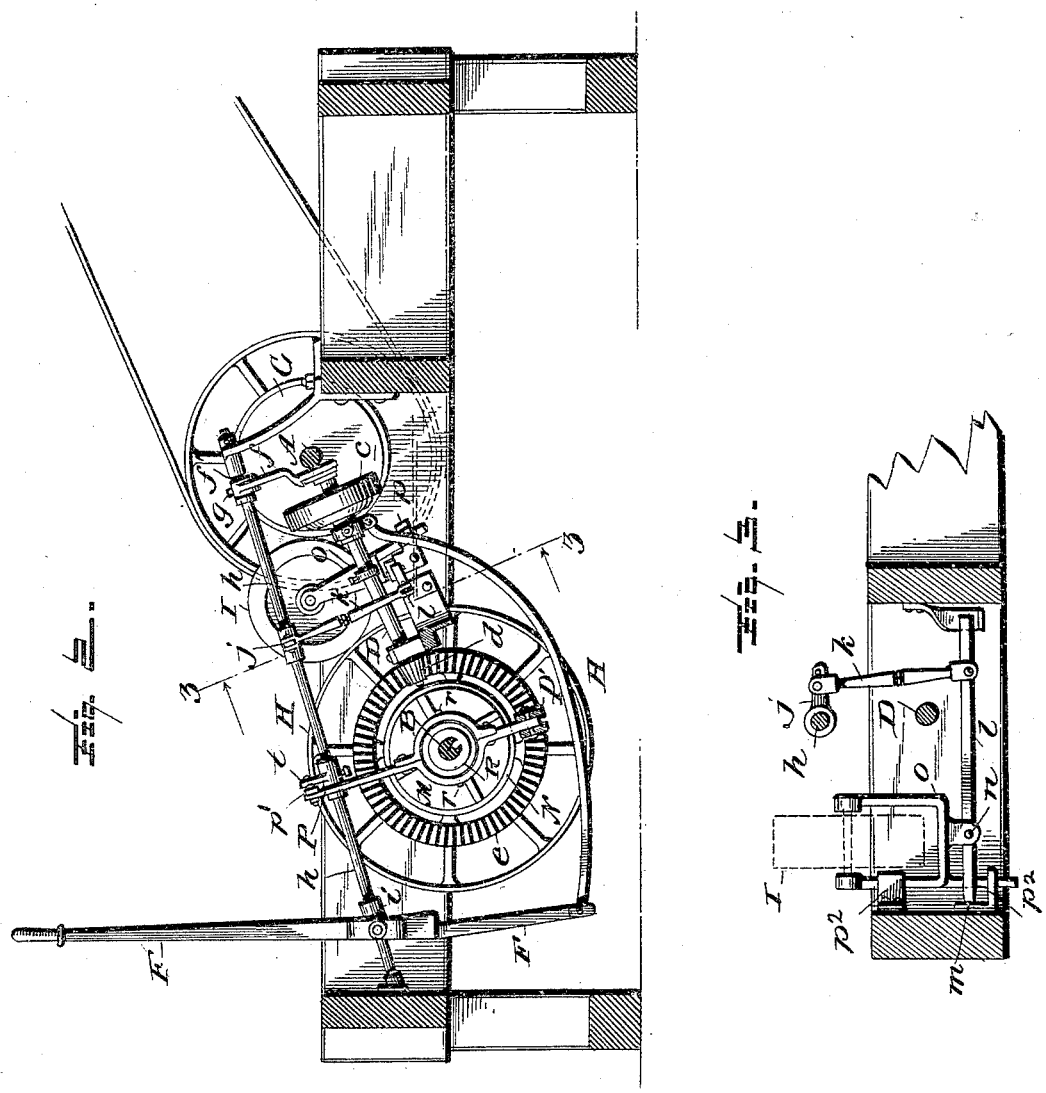
Witnesses
L. C. Hills.
Evella Dick.
Inventors:
E. A. Reese
S. N. Hench
W. A. Dromgold
by Llewellyn Bailey Attorney

UNITED STATES PATENT OFFICE.

EDWIN A. REESE, SAMUEL N. HENCH, AND WALKER A. DROMGOLD, OF YORK, PENNSYLVANIA; SAID REESE ASSIGNOR TO SAID HENCH AND DROMGOLD.

MECHANISM FOR OPERATING SAWMILL-CARRIAGES.

SPECIFICATION forming part of Letters Patent No. 491,447, dated February 7, 1893.

Application filed December 3, 1892. Serial No. 453,995. (No model.)

*To all whom it may concern:*

Be it known that we, EDWIN A. REESE, SAMUEL N. HENCH, and WALKER A. DROMGOLD, of York, in the county of York and State of Pennsylvania, have invented certain new and useful Improvements in Mechanism for Operating Sawmill-Carriages, of which the following is a specification.

This invention relates to that class of mechanism for operating saw mill carriages in which the devices for effecting the forward or feed movement of the carriage are separate and distinct from those by which the back motion of the carriage is effected; and it is more particularly designed for use in connection with, and as an improvement upon that form of such mechanism which is set forth and claimed in the application for Letters Patent filed by J. A. Richey, S. N. Hench and W. A. Dromgold, on August 2, 1892, bearing Serial No. 441,925.

To an understanding of our improvement it will be necessary to describe in connection with it the mechanism which is comprised in the application last above referred to; and this we shall proceed to do by reference to the accompanying drawings in which—

Figure 1 is a plan view of so much of a sawing machine as needed to illustrate our improvement. Fig. 2 is a section on line 2—2 Fig. 1. Fig. 3 is a section on line 3—3, Fig. 2, of the sliding bracket bearing and its connections. Fig. 4 is an enlarged sectional elevation of the clutch mechanism.

A is the driven shaft on which the saw X is mounted; B the carriage shaft, connected to the carriage C by a pinion $a$ on the shaft which meshes with a rack on the underside of the carriage.

D is an inclined feed shaft having on one end a friction gear $c$ adapted to bear with its periphery against the side of friction wheel G on shaft A—said friction gear $c$ having a longitudinal spline and groove connection with its shaft so that it can be moved nearer to or farther from the axis of the friction wheel G for the purpose of varying the feed. On the other end of feed shaft D is a beveled pinion $d$ gearing with and driving a beveled toothed wheel $e$ on carriage shaft B. Shaft D has its bearing at the end where friction gear $c$ is located in an arm $f$ terminating at the top in a yoke $f'$ in which fits an eccentric $g$, secured on a shaft $h$, which latter shaft is supported in suitable end bearings in the main frame. By rocking the shaft $h$ (the eccentric shaft) its eccentric will be caused to throw the yoke to one side or the other and thus to throw the friction gear $c$ into or out of contact with the driving wheel G as desired. The eccentric shaft for this purpose is rocked by an operating lever F pivoted to a sleeve $i$ secured on the shaft. The lower end of the operating lever F is connected to the hub of friction gear $c$ by a bowed connecting rod pinned at one end to the lever and at the other end to the hub. In this way the carriage feed can be started, varied and stopped by the one operating lever.

The back motion of the carriage is effected by friction wheels G, H, on the driven shaft and carriage shaft respectively in connection with an intermediate friction wheel I which takes motion from the periphery of the drive wheel G, and imparts it to the carriage wheel H. The intermediate I is carried in a bracket bearing $o$ having a leg or extension which slides in guides $p^2$ fast to the frame. The bracket bearing is pinned at $n$ to a lever $l$ extending cross-wise of and below the feed shaft D and having its fulcrum on the frame at $m$; and said lever is joined by a connecting rod $k$ to a radial arm $j$ on the rocking eccentric shaft $h$. The arrangement is such that when shaft $h$ is rocked to the left (which is the direction in which in this instance it must be rocked in order to throw the friction gear $c$ into contact with the driver) the bracket bearing $o$ will be lifted, thus throwing the intermediate out of gear. The reverse action takes place when the shaft $h$ is rocked in the other direction; the friction gear $c$ is thereby thrown out of contact with its driver and the bracket $o$ is lowered so as to throw the intermediate into gear with its wheels G, thus backing the carriage.

Thus far what there is of novelty, in the machine is not of our invention, but is the subject of the application of Richey, Hench and Dromgold, Serial No. 441,925, hereinbefore referred to. In that machine however the wheels $c$, $d$, $e$, revolve when the carriage is backing, this being due to the fact that the beveled spur wheel e is fast upon the carriage shaft B. In thus revolving they do no work it is true, but their revolution at this time (the direction of which is the reverse of that in which they revolve in feeding the carriage) is detrimental not only because it is productive of wear, but also because when after the carriage is backed, the operating lever is reversed to throw the friction gear c into contact again with its driver to effect the forward feed, the friction gear which at that time is in rapid reverse revolution, slips on its driver and frequently makes one or more backward or reverse turns before that motion can be arrested and changed into one in unison with its driver, and this of course is extremely detrimental to the face of friction gear. To remedy this difficulty is the object of our present improvement which consists in mounting the feed gear e loosely on the carriage shaft and combining it with a clutch (also on said shaft) which is connected to the operating lever in such manner that when the lever is moved in a direction to cause the carriage to back the gear e is unclutched from the shaft, and on the other hand is clutched to the shaft when the lever is moved in the direction requisite for the forward feed of the carriage. To this end we, in the present instance, make use of the following arrangement, which we have found on the whole to be the most convenient for the purpose. The beveled spur wheel or gear e is mounted to loosely revolve between collars on the carriage shaft. On the same shaft is the longitudinally movable member M of a friction clutch, the other member N of which is on the gear e. The movable member has a longitudinal spline and groove connection with the shaft so that while compelled to rotate with the shaft it can at the same time slide lengthwise thereon, and it is pressed up into engagement with the other member N by a spiral or other suitable spring S interposed between its hub and a collar fixed on the shaft. On the hub of the movable member M is a loose freely revolving ring R provided with trunnions r, which are engaged by the clutch lever P, pivoted at its lower end to a bracket or stand P' fixed to the frame, and connected at its upper end by a connecting rod p, to a crank arm t fixed on the rocking eccentric shaft h. The connecting rod is pinned at one end to the crank arm t, and at the other end has a pin and slot connection p', with the clutch lever P, the object of which is to permit to the rocking shaft the range of movement needed to effect the feed and back motions of the carriage, without moving the movable member of the clutch more than the slight distance requisite in order to put it into and out of engagement with the other members. Under this arrangement whenever the operating lever is thrown over in the direction to back the carriage the spur wheel e is at once thrown out of clutch with the carriage shaft, and the wheels c, d, e, consequently are at rest during the back motion of the carriage. The moment the position of the operating lever is reversed (thereby throwing the friction wheel c into gear, and the intermediate I out of gear) the spur wheel e is at once clutched to the carriage shaft, and the forward feed of the carriage consequently takes place.

Having described our improvement and the best way now known to us of carrying the same into effect, what we claim as new and of our own invention is:—

The combination of the carriage, the carriage shaft, the backing mechanism, the forward feed mechanism independent of and separate from the backing mechanism and comprising as one of its members a gear wheel loose upon the carriage shaft, a single operating lever connected to and controlling both of said mechanisms, and a clutch mechanism also connected to and operated by the said operating lever whereby the said forward feed gear wheel is clutched to or unclutched from its shaft according as the feed mechanism or the backing mechanism is in action, substantially as and for the purposes hereinbefore set forth.

In testimony whereof we affix our signatures in presence of two witnesses.

EDWIN A. REESE.
SAMUEL N. HENCH.
WALKER A. DROMGOLD.

Witnesses:
ARTHUR N. GREEN,
ROBERT J. LEWIS.